(12) United States Patent
Lia et al.

(10) Patent No.: US 7,720,157 B2
(45) Date of Patent: May 18, 2010

(54) ARRANGEMENT AND METHOD FOR GENERATING CP IMAGES

(75) Inventors: Tom Erik Lia, Askim (NO); Tom-Ivar Johansen, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 1467 days.

(21) Appl. No.: 11/055,176

(22) Filed: Feb. 11, 2005

(65) Prior Publication Data

US 2005/0195275 A1    Sep. 8, 2005

(30) Foreign Application Priority Data

Feb. 13, 2004    (NO) .................................. 20040661

(51) Int. Cl.
*H04N 7/12*    (2006.01)
(52) U.S. Cl. ............. 375/240.24; 375/240; 375/240.01; 375/240.12
(58) Field of Classification Search ................. 375/240, 375/240.01, 240.02, 240.12, 240.24; 348/14.09; 382/238
See application file for complete search history.

(56) References Cited

U.S. PATENT DOCUMENTS

| | | | | |
|---|---|---|---|---|
| 5,568,184 | A * | 10/1996 | Shibata et al. ........... | 348/14.09 |
| 6,288,740 | B1 | 9/2001 | Lai | |
| 6,606,112 | B1 | 8/2003 | Falco | |
| 6,731,625 | B1 | 5/2004 | Eastep | |
| 7,352,809 | B2 * | 4/2008 | Wenger et al. ......... | 375/240.02 |
| 2002/0064149 | A1 | 5/2002 | Elliot | |
| 2005/0008240 | A1 * | 1/2005 | Banerji et al. ............... | 382/238 |

FOREIGN PATENT DOCUMENTS

| | | |
|---|---|---|
| EP | 1024643 | 8/2000 |
| JP | 11-239331 | 8/1999 |
| WO | WO 9823080 | 5/1998 |
| WO | WO 03065706 | 8/2003 |

OTHER PUBLICATIONS

PCT Written opinion in PCT/NO2005/000050.

* cited by examiner

*Primary Examiner*—Allen Wong
(74) *Attorney, Agent, or Firm*—Oblon, Spivak, McClelland, Maier & Neustadt, L.L.P.

(57) ABSTRACT

A method for creating a coded target Continuous Presence (CP) image according to a video coding standard from a number of coded video signals including defined orders of macroblocks, each including coded video signals corresponding to a respective endpoint video image, received from endpoints participating in a multipoint video conference, the method including: decoding the coded video signals with plural decoders to generate decoded video signals; spatially mixing the decoded video signals, resulting in a number of CP images including regions respectively associated with each of the endpoint video images with a mixing unit; encoding the CP images with plural encoders; and rearranging macroblocks of the encoded CP images to create the target coded CP image with one or more re-packer units.

14 Claims, 9 Drawing Sheets

Figure 1

PRIOR ART

PRIOR ART

PRIOR ART

*PRIOR ART*

Figure 4

Figure 5: Arrangement of GOBs in a CIF picture

| GSTUF | GBSC | GN | GSBI | GFID | GQUANT | Macroblock Data |

Figure 6: Structure of GOB layer

| COD | MCBPC | MODB | CBPB | CBPY | DQUANT | MVD | MVD2 | MVD3 | MVD4 | MVDB | Block Data |

Figure 7: Structure of macroblock layer

Rearranged CP image transmitted to site 4

| Site 1 | Site 2 |
| Site 3 | Site 5 |

CP image 2

| Site 5 | |
| | |

CP image 1

| Site 1 | Site 2 |
| Site 3 | Site 4 |

ARRANGEMENT AND METHOD FOR GENERATING CP IMAGES

FIELD OF THE INVENTION

The present invention relates to video conferencing, and in particular to generating Continuous Presence (CP) images in a Multipoint Control Unit (MCU).

BACKGROUND OF THE INVENTION

Transmission of moving pictures in real-time is employed in several applications like e.g. video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and can not be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors. The prediction process is typically performed on square block sizes (e.g. 16×16 pixels).

Video conferencing systems also allow for simultaneous exchange of audio, video and data information among multiple conferencing sites. Systems known as multipoint control units (MCUs) perform switching functions to allow multiple sites to intercommunicate in a conference. The MCU links the sites together by receiving frames of conference signals from the sites, processing the received signals, and retransmitting the processed signals to appropriate sites. The conference signals include audio, video, data and control information. In a switched conference, the video signal from one of the conference sites, typically that of the loudest speaker, is broadcast to each of the participants. In a continuous presence conference, video signals from two or more sites are spatially mixed to form a composite video signal for viewing by conference participants. The continuous presence or composite image is a combined picture that may include live video streams, still images, menus or other visual images from participants in the conference.

In a typical continuous presence conference, the video display is divided into a composite layout having areas or regions (e.g., quadrants). Sites are selected at conference setup from the sites connected in the conference for display in the regions. Common composite layouts include four, nine or sixteen regions. The layout is selected and then fixed for the duration of the conference.

Some conference arrangements provide different composite signals or video mix such that each site may view a different mix of sites. Another arrangement uses voice activated quadrant selection to associate sites with particular quadrants. That arrangement enables conference participants to view not only fixed video mix sites, but also a site selected on the basis of voice activity. However, the layout in terms of number of regions or quadrants is fixed for the conference.

Figure 1:
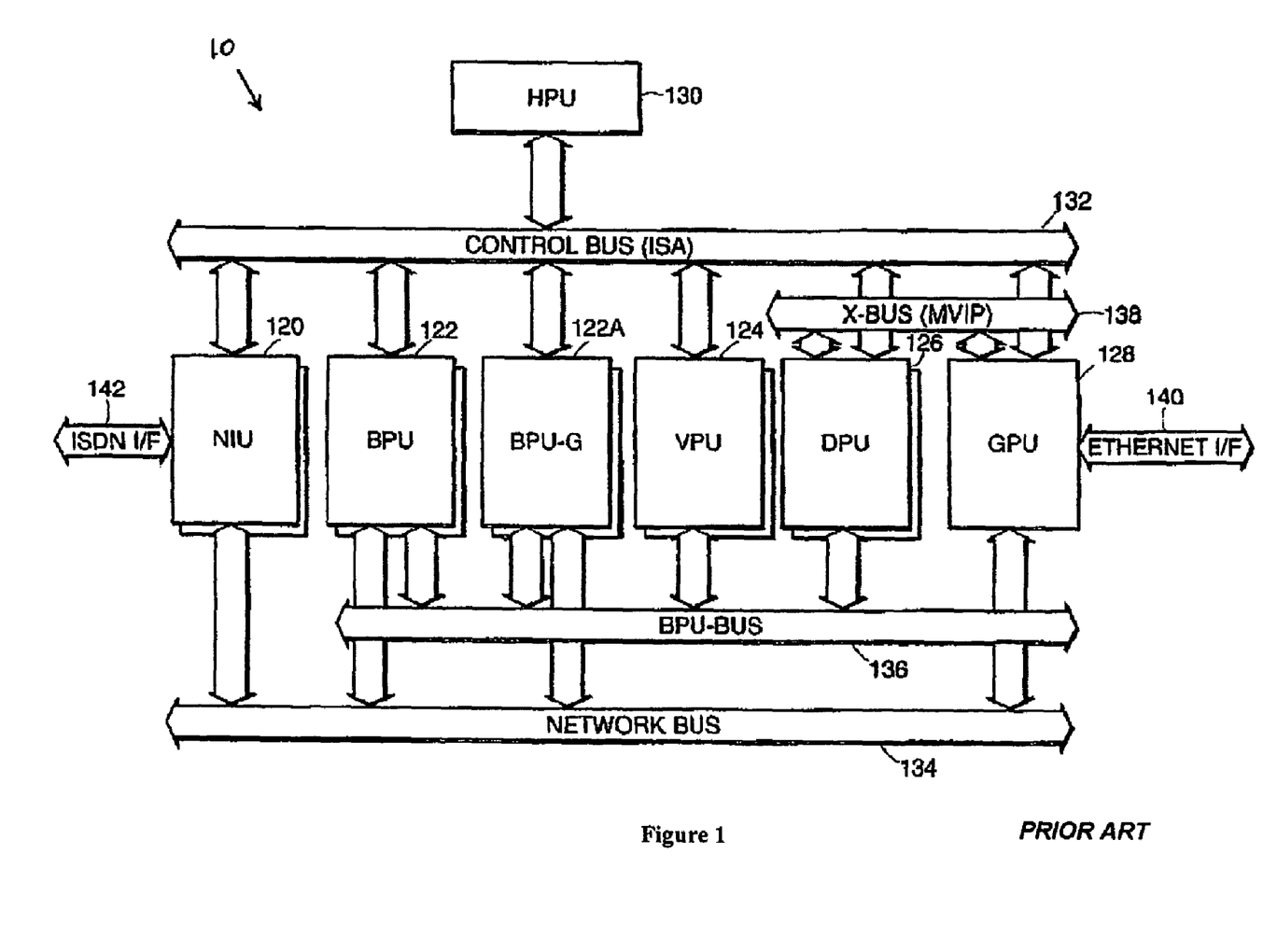
FIG. 1 is a block diagram of an MCU configuration.

Referring now to FIG. 1, there is shown a schematic diagram of an embodiment of an MCU 10 of the type disclosed in U.S. Pat. No. 5,600,646, the disclosure of which is hereby expressly incorporated by reference. The MCU 10 also includes H.323 functionality as disclosed in U.S. Pat. No. 6,404,745, the disclosure of which is hereby also expressly incorporated by reference. In addition, video processing in the MCU has been enhanced, as will be described further herein. The features described herein for MCU 10 can be embodied in a Tandberg MCU.

The MCU 10 includes at least one Network Interface Unit (NIU) 120, at least one Bridge Processing Unit (BPU) 122, a Video Processing Unit (VPU) 124, a Data Processing Unit (DPU) 126, and a Host Processing Unit (HPU) 130. In addition to a host Industry Standard Architecture (ISA) control bus 132, the MCU 10 includes a network bus 134, a BPU bus 136 and an X-bus 138. The network bus 134 complies with the Multi-Vendor Integration Protocol (MVIP) while the BPU bus 136 and the X-bus are derivatives of the MVIP specification. The HPU 130 provides a management interface for MCU operations. Each of the foregoing MCU elements is further described in the above-referenced U.S. Pat. Nos. 5,600,646 and 6,404,745.

The H.323 functionality is provided by the addition of a Gateway Processing Unit (GPU) 128 and a modified BPU referred to as a BPU-G 122A. The GPU 128 runs H.323 protocols for call signaling and the creation and control of audio, video and data streams through an Ethernet or other LAN interface 140 to endpoint terminals. The BPU-G 122A is a BPU 122 that is programmed to process audio, video and data packets received from the GPU 128.

The MCU operation is now described at a high-level, initially for circuit switched conferencing and then for packet switched H.323 conferencing. In circuit switched conferencing, digital data frames from H.320 circuit switched endpoint terminals are made available on the network bus 134 through a network interface 142 to an NIU 120. The BPUs 122 process the data frames from the network bus 134 to produce data frames which are made available to other BPUs 122 on the BPU bus 136. The BPUs 122 also extract audio information from the data frames.

The BPUs 122 combine compressed video information and mixed encoded audio information into frames that are placed on the network bus 134 for transmission to respective H.320 terminals.

In cases where the audiovisual terminals operate at different transmission rates or with different compression algorithms or are to be mixed into a composite image, multiple video inputs are sent to the VPU 124 where the video inputs are decompressed, mixed and recompressed into a single video stream. This single video stream is then passed back through the BPU 122 which switches the video stream to the appropriate endpoint terminals.

For packet-based H.323 conferencing, the GPU 128 makes audio, video and data packets available on the network bus 134. The data packets are processed through the DPU 126. The BPU-G 122A processes audio and video packets from the network bus 134 to produce audio and video broadcast mixes which are placed on the network bus 134 for transmission to respective endpoint terminals through the GPU 128. In addition, the BPU-G 122A processes audio and video packets to produce data frames which are made available to the BPUs 122 on the BPU bus 136. In this manner, the MCU 14 serves a gateway function whereby regular BPUs 122 and the BPU-G 122A can exchange audio and video between H.320 and H.323 terminals transparently.

Having described the components of the MCU 10 that enable the basic conference bridging functions, a high level description of the flexibility provided by the VPU 124 is now described with reference to the functional block diagram of FIG. 2. In the MCU 10, compressed video information from up to five audiovisual terminals that are in the same conference are routed to a particular VPU 124 over the BPU bus 136. The VPU 124 comprises five video compression processors (VCP0-VCP4), each having a video decoder/encoder pair 102-*i*, 106-*i*, and pixel scaling blocks 104-*i*, 108-*i*.

A video decoder/encoder pair 102-*i*, 106-*i* is assigned to the compressed video information stream associated with each particular site in the conference. Each video decoder 102-*i* decodes the compressed video information using the algorithm that matches the encoding algorithm of its associated site. Included as part of the video decoder 102-*i* may be the processing to determine the framing, packets, and checksums that may be part of the transmission protocol. It should be noted that a processor encoded video stream can be assigned to multiple sites (e.g., a continuous presence application having more than five sites in the conference). In addition, a decoder/encoder pair 102-*i*, 106-*i* can switch among the sites within a conference.

The decoded video information (e.g., pixels) is scaled up or down, if necessary, by a pixel scaling block 104-*i* to match the pixel resolution requirements of other sites in the conference that will be encoding the scaled pixels. For example, a desktop system may encode at a resolution of 256×240 pixels while an H.320 terminal may require a pixel resolution of 352×288 pixels for a Common Intermediate Format (CIF) image. Other common formats include Quarter Common Intermediate Format (QCIF) (176×144 pixels), 4CIF (704× 576), SIF (352×240), 4SIF (704×480), VGA (640×480), SVGA (800×600) and XGA (1024×768).

The VPU 124 includes a pixel bus 182 and memory 123. The system disclosed in U.S. Pat. No. 5,600,646 uses a time division multiplex bus. In particular, each decoder 102-*j* outputs pixels onto pixel bus 182 to memory 123. Each encoder 106-*j* may retrieve any of the images from the memory 123 on the pixel bus for re-encoding and/or spatial mixing or compositing. Another pixel scaling block 108-*j* is coupled between the pixel bus 182 and the encoder 106-*j* for adjusting the pixel resolution of the sampled image as needed.

Figure 3:
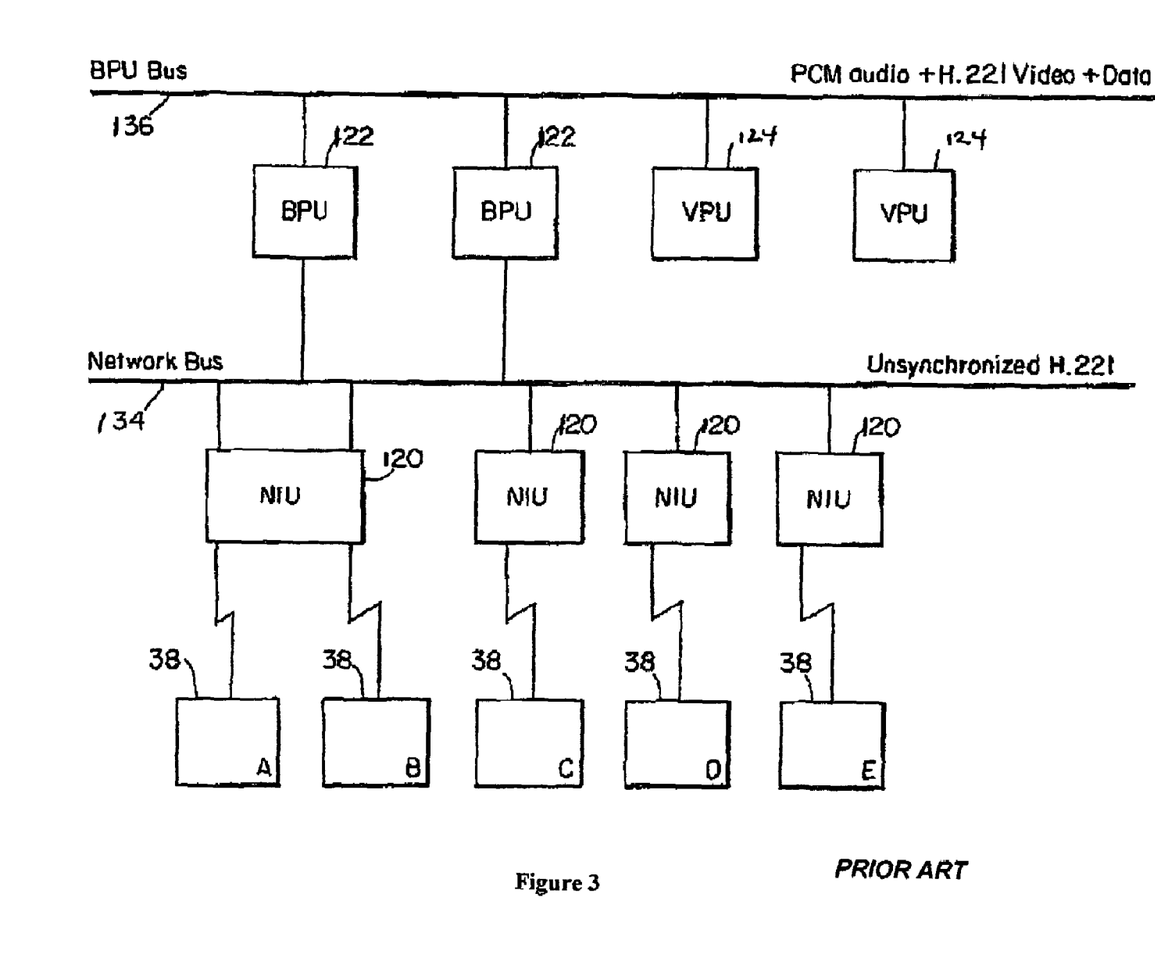
FIG. 3 is a block diagram of an MCU configuration illustrating data flow for continuous presence conferencing.
Figure 4:
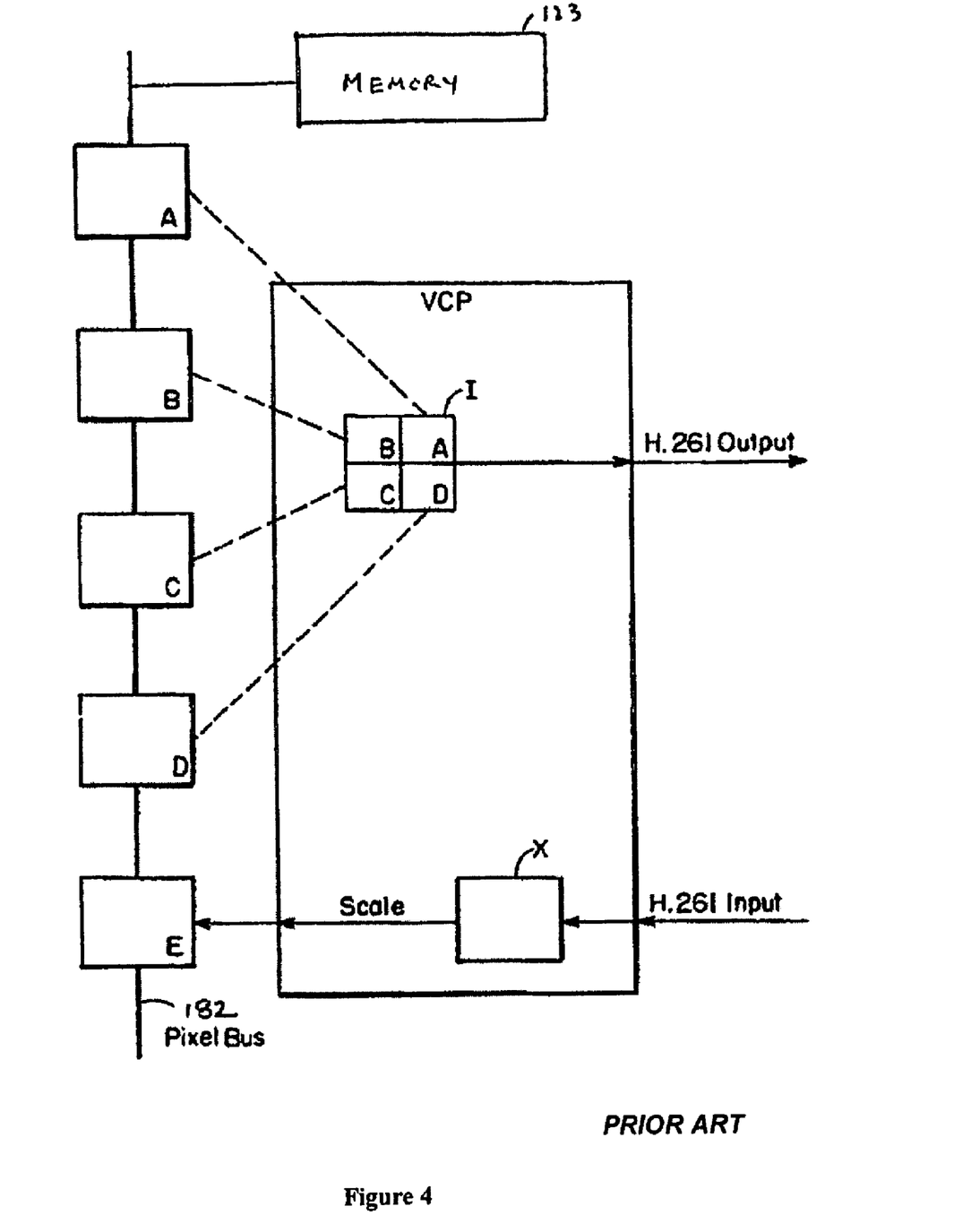
FIG. 4 is a block diagram illustrating image tilting in a continuous presence conference.

A continuous presence application is now described with reference to FIGS. 3 and 4. For simplicity the endpoint terminals as shown are H.320 terminals. In FIG. 3, data from sites 38 arrive over a communications network to respective NIUs 120. Five sites 38 (A, B, C, D, E) are connected in the conference. Sites A and B are shown connected to a particular NIU 120 which supports multiple codec connections (e.g., a T1 interface). The other sites C, D, and E connect to NIUs 120 supporting only a single codec connection (e.g., an ISDN interface). Each site 38 places one or more octets of digital data onto the network bus 134 as unsynchronized H.221 framed data. The BPUs 122 then determine the H.221 framing and octet alignment. This aligned data is made available to all other units on the BPU bus 136. The BPUs 122 also extract audio information from the H.221 frames and decode the audio into 16 bit PCM data. The decoded audio data is made available on the BPU bus 136 for mixing with audio data from other conference sites.

Aligned H.221 frames are received by the VPU 124 for processing by encoder/decoder elements called video compression processors (VCPs). The VPU 124 has five VCPs (FIG. 2) which in this example are respectively assigned to sites A, B, C, D, E. A VCP on the VPU 124 which is assigned to site E is functionally illustrated in FIG. 4. Compressed video information (H.261) is extracted from the H.221 frames and decoded by the VCP as image X. The decoder video image X is placed on the pixel bus 182 through a scaling block. FIG. 4 shows the pixel bus 182 with decoded video frames from each site A, B, C, D, E successively retrieved from memory 123 identified by their respective RAM addresses. The VCP assigned to site E receives the decoded video frames from sites A, B, C and D which are then tiled (spatially mixed) into a single composite image I. The tiled image I is then encoded as H.261 video within H.221 framing and placed on the BPU bus 136 (FIG. 3) for BPU processing as described above.

As can be seen from the description above, transcoding requires considerable processing resources, as raw pixel data has to be mixed and thereafter encoded to form a mixed view or a Continuous Presence view. To avoid self view, i.e. to avoid that the CP views contains a picture of the respective participants to which they are transmitted, the MCU has to include at least one encoder for each picture in a CP view. To allow for CP 16, the MCU then must include at least 16 encoders.

SUMMARY OF THE INVENTION

It is an object of the present invention to provide a method and an arrangement for avoiding self-view reducing the required numbers of encoders and processing time.

According to a first aspect of the present invention, the above object and other advantages are obtained by a method for creating a coded target Continuous Presence (CP) image according to a video coding standard from a number of coded video signals including defined orders of macroblocks, each comprising coded video signals corresponding to a respective endpoint video image, received from endpoints participating in a multipoint video conference, said method comprising the step of creating the coded target CP image by rearranging said orders of macroblocks in a predefined or controlled way.

Advantageously, the method further comprises, prior to the step of creating the coded target CP image, the step of requesting the endpoints to code the respective endpoint video images according to the video standard and a certain resolution, bit rate and scaling.

Alternatively, the method further comprises, prior to the step of creating the coded target CP image, the steps of decoding the video signals to the corresponding endpoint video images, spatially mixing the endpoint video images to a number of CP images composed of regions respectively associated with each of the endpoint video images, and coding said number of CP images to a number of coded CP images respectively, resulting in the defined orders of macroblocks corresponding to the video coding standard and a merging of region boundaries and macroblock boundaries.

Advantageously, in the latter embodiment, the coded CP images and the coded target CP image are each of a CIF format with 18 Group of Blocks (GOBs), each including 22 macroblocks, arranged in a stack formation so that the first 9 GOBs represent upper regions, and the last 9 GOBs represent lower regions.

Further, the step of creating the coded target CP image advantageously includes replacing m numbers of macroblocks representing a region width in n numbers of succeeding GOBs representing a region height in a first of the number of coded CP images with m numbers of macroblocks in n numbers of succeeding GOBs from a second of the number of coded CP images.

Advantageously, m=11, n=9, and said regions each represents one quadrant of a CP image.

Advantageously, m=7 or m=8, n=6 and said regions each represents one eighth of a CP image.

According to a second aspect of the present invention, the above object and other advantages are obtained by an arrangement in a Multipoint Control Unit (MCU) for creating a coded target CP image according to a video coding standard from a number of coded video input signals, each corresponding to a respective endpoint video image, received from endpoints participating in a multipoint video conference, the arrangement comprising one decoder for each coded video input signal configured to decoding the video signals to the corresponding endpoint video images, a mixing and scaling unit configured to spatially mixing the endpoint video images to a number of CP images composed of regions respectively associated with each of the endpoint video images, a number of encoders, configured to code said number of CP images to a number of coded CP images, one data buffer for each of said encoders to which CP images respectively are inserted in orders of macroblocks corresponding to the video coding standard and a merging of region boundaries and macroblock boundaries, and one re-packer for each MCU output configured to create the coded target CP image by fetching said macroblocks in a predefined or controlled order.

Advantageously, the coded CP images and the coded target CP image each are of a CIF format with 18 Group of Blocks (GOBs), each including 22 macroblocks, arranged in a stack formation so that the first 9 GOBs represent upper regions, and the last 9 GOBs represent lower regions.

Advantageously, the re-packer is further configured to replacing m numbers of macroblocks representing a region width in n numbers of succeeding GOBs representing a region height in a first of the number of coded CP images with m numbers of macroblocks in n numbers of succeeding GOBs from a second of the number of coded CP images.

Advantageously, m=11, n=9, and said regions each represents one quadrant of a CP image.

Advantageously, m=7 or m=8, n=6, and said regions each represents one eighth of a CP image.

BRIEF DESCRIPTION OF THE DRAWINGS

In order to make the invention more readily understandable, the discussion that follows will refer to the accompanying drawings, in which.

BEST MODE OF CARRYING OUT THE INVENTION

The present invention utilises the bit structure of the ITU H.26* standard to reduce the processing time and requirements in an MCU for generating CP views without self view. To understand the bit structure characteristics that is being used, the picture block structure according to H.263 is described in the following.

Figure 5:
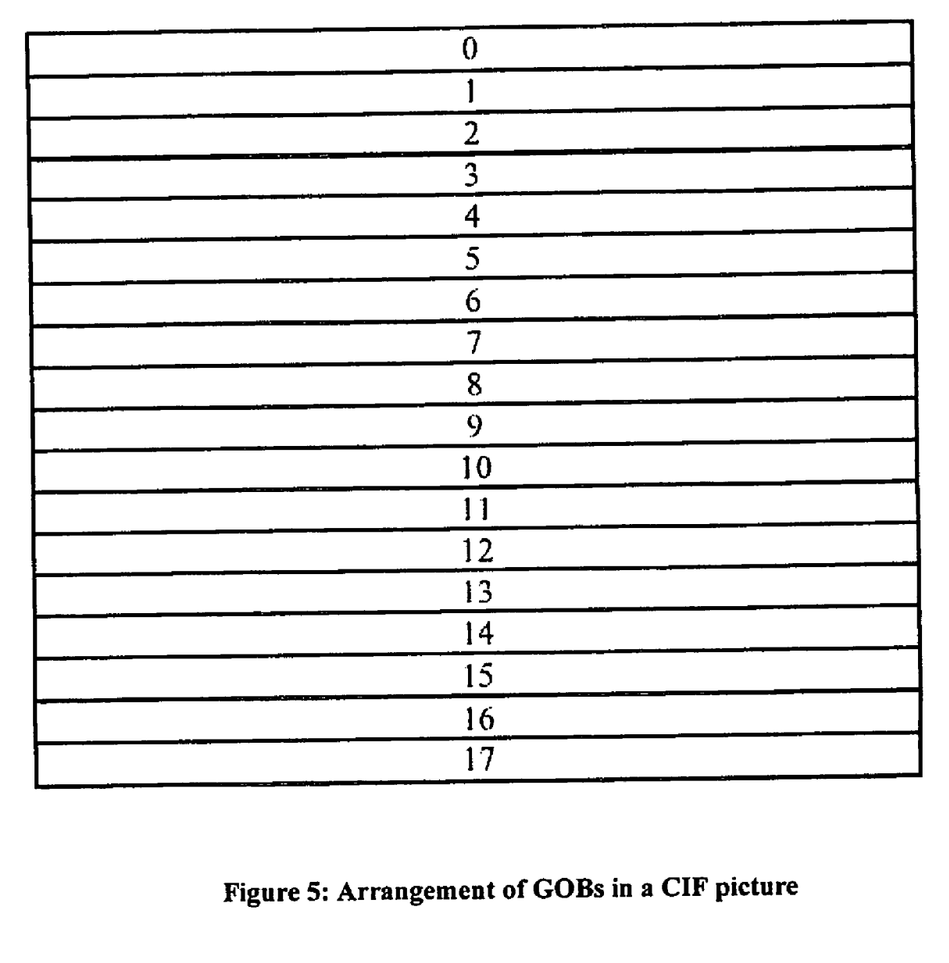
FIG. 5 is block diagram of the arrangements of Group of Blocks in a CIF picture.
Figure 6:
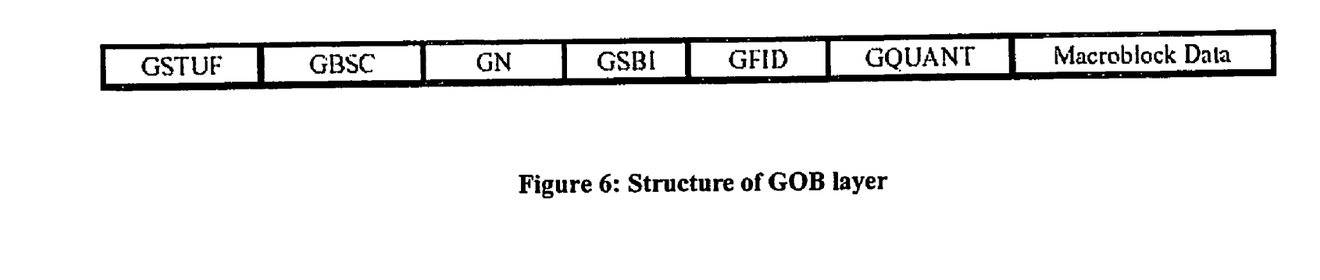
FIG. 6 illustrates the Group of Blocks layer according to H.263.

According to H.263, each picture is divided into blocks representing 8×8 pixels. The blocks are arranged into macroblocks, which for the luminescence part of the pixels means 16 (8×8) blocks, and for the chromiscence part of the pixels means 4 (2×2) blocks. A Group Of Blocks (GOB) normally represents 22 macroblocks, and the number of GOBs per picture is 6 for sub-QCIF, 9 for QCIF, and 18 for CIF, 4CIF and 16CIF. The GOB numbering is done by use of vertical scan of the GOBs, starting with the upper GOB (number 0) and ending with the bottom-most GOB. An example of the arrangement of GOBs in a picture is given for the CIF picture format in FIG. 5. Data for each GOB consists of a GOB header followed by data for macroblocks. Data for GOBs is transmitted per GOB in increasing GOB number. The start of a GOB is identified by a Group of Block Start Code (GBSC). The structure of the GOB layer is shown in FIG. 6.

Figure 7:
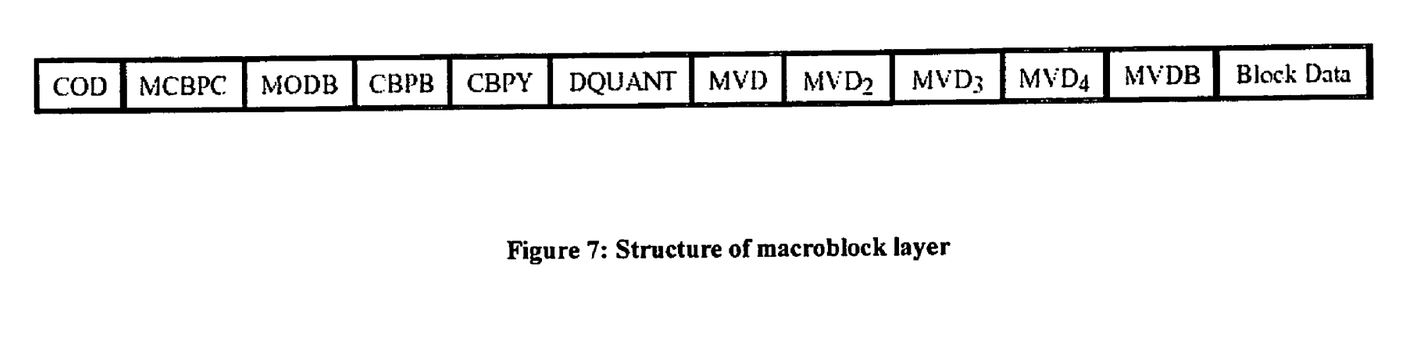
FIG. 7 illustrates the macroblock layer according to H.263.

Data for each macroblock consists of a macroblock header followed by data for blocks. The structure is shown in FIG. 7. COD is only present in pictures that are not of type 'INTRA', for each macroblock in these pictures. A bit which when set to "0" signals that the macroblock is coded. If set to "1", no further information is transmitted for this macroblock; in that case the decoder shall treat the macroblock as an INTER macroblock with motion vector for the whole block equal to zero and with no coefficient data.

If COD set to "0", the data part of the macroblock includes information of the respective blocks in the macroblock, and this information is represented by motion vectors indicating the position in previous pictures to which the included pixels are equal.

Figure 2:
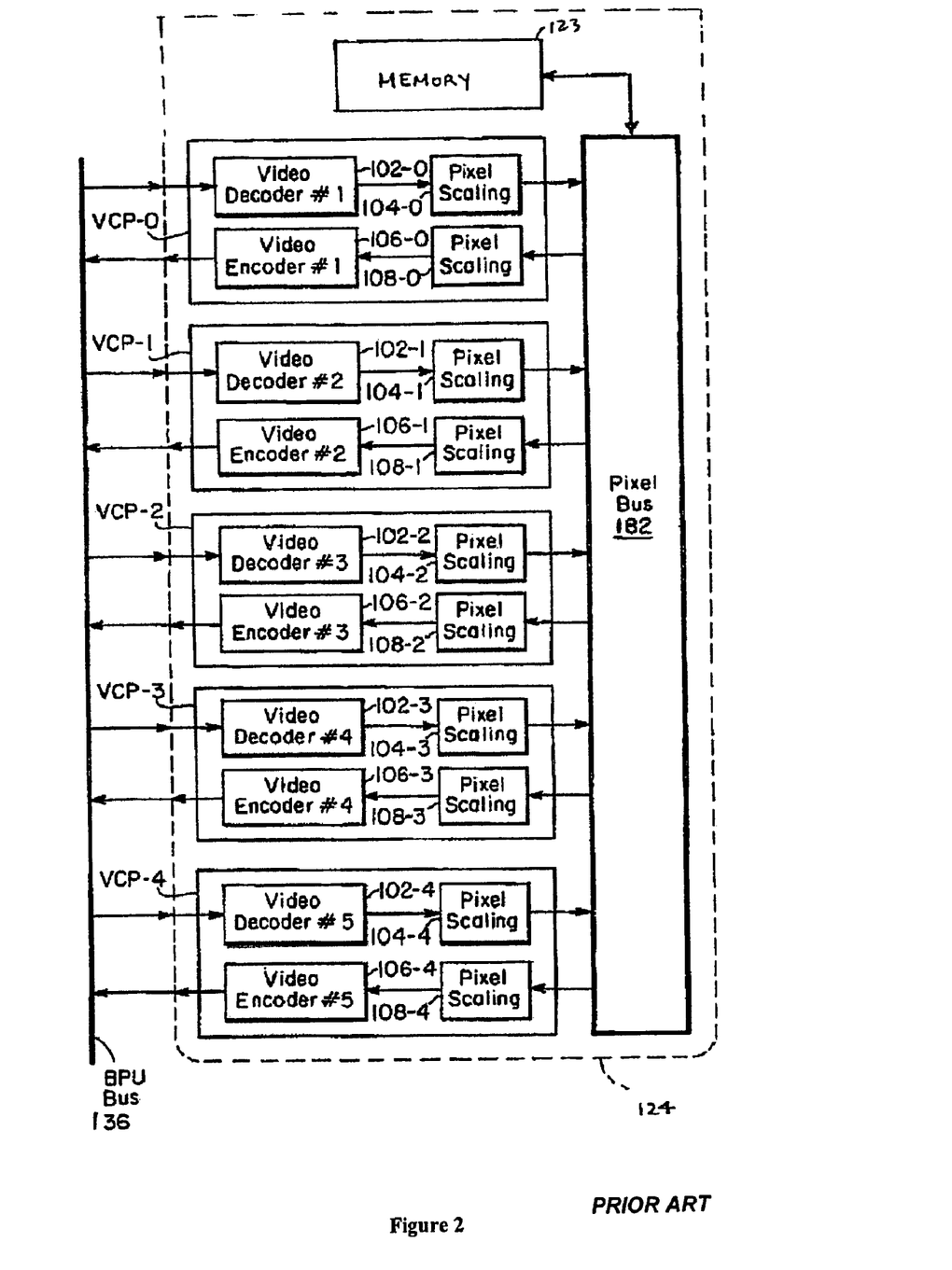
FIG. 2 is a schematic block diagram of an embodiment of a VPU.

Conventionally, avoiding self view in a CP picture requires special coding for each of the participants implying one encoder for each outgoing data stream in the MCU, as indicated in FIG. 2. The present invention utilizes the macroblock structure of already coded video data to achieve tailored mix of a CP picture dependent on the receiver.

In the following example embodiment of the present invention, consider a conference with five endpoint sites capturing video pictures of the CIP format and coding the pictures according to the H.263 standard. In the MCU, the data stream from the respective participants is decoded by decoders associated with respective MCU inputs according to H.263. After decoding, raw pixel data from the respective participants will be available on an internal bus in the MCU, ready for mixing and transcoding.

In the case of five participants, it would be obvious to choose a CP 4 format of the mixed picture to be transmitted back to the respective sites. The mixed format may be selected by the MCU according to the "Best Impression" principals described in U.S. patent application Ser. No. 10/601,095, which is hereby expressly incorporated by reference.

Figure 8:
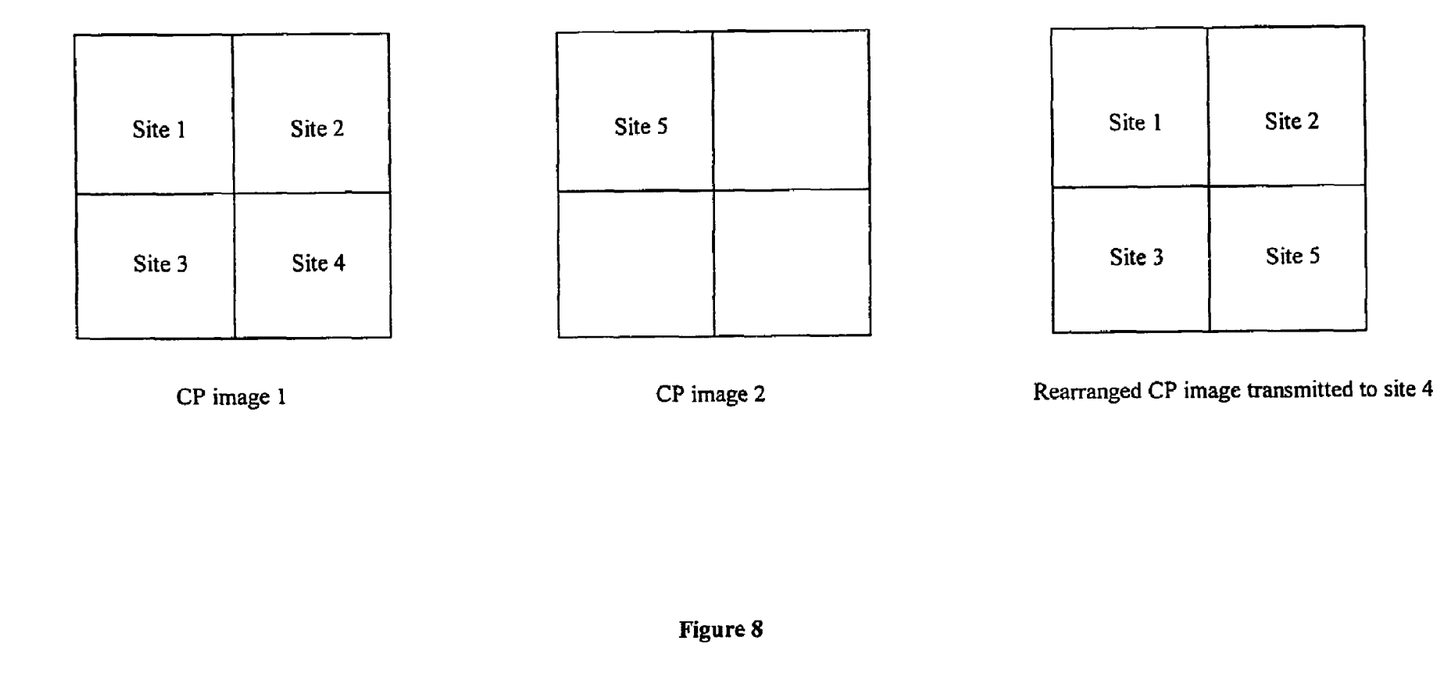
FIG. 8 is block diagrams illustrating three different continuous presence images used in one embodiment of the present invention.

According to this example embodiment of the invention, two different CP4 images, CP image 1 and CP image 2, are coded by each respective encoder as illustrated in FIG. 8. CP image 1 includes the images received from site 1, 2, 3 and 4, while CP image 2 includes the received images from site 5 in one quadrant leaving the remaining quadrants empty. When coding the CP images and arranging the coded data in the block system described above, the quadrants boundaries coincide with the macroblock boundaries in the GOBs. As for CP image 1, the first 11 macroblocks in the first GOB includes data from the image of site 1, while the 11 last macroblocks in the first GOB includes data from the image of site 2.

According to the present invention, the MCU rearranges the macroblocks in each CP image according to the receiver. As an example, in the CP image transmitted to site 4, the 11 last macroblocks in each of the 9 last GOBs of CP image 1 is replaced by the 11 first macroblocks in each of the 9 first GOBs of CP image 2, respectively. This results in a new decoded CP image, which includes the image received from site 5 instead of the image received from site 4. This CP image is transmitted back to site 4, consequently avoiding self-view at that site.

Corresponding replacements or rearrangements is executed for the four other CP images respectively associated with the other sites.

Figure 9:
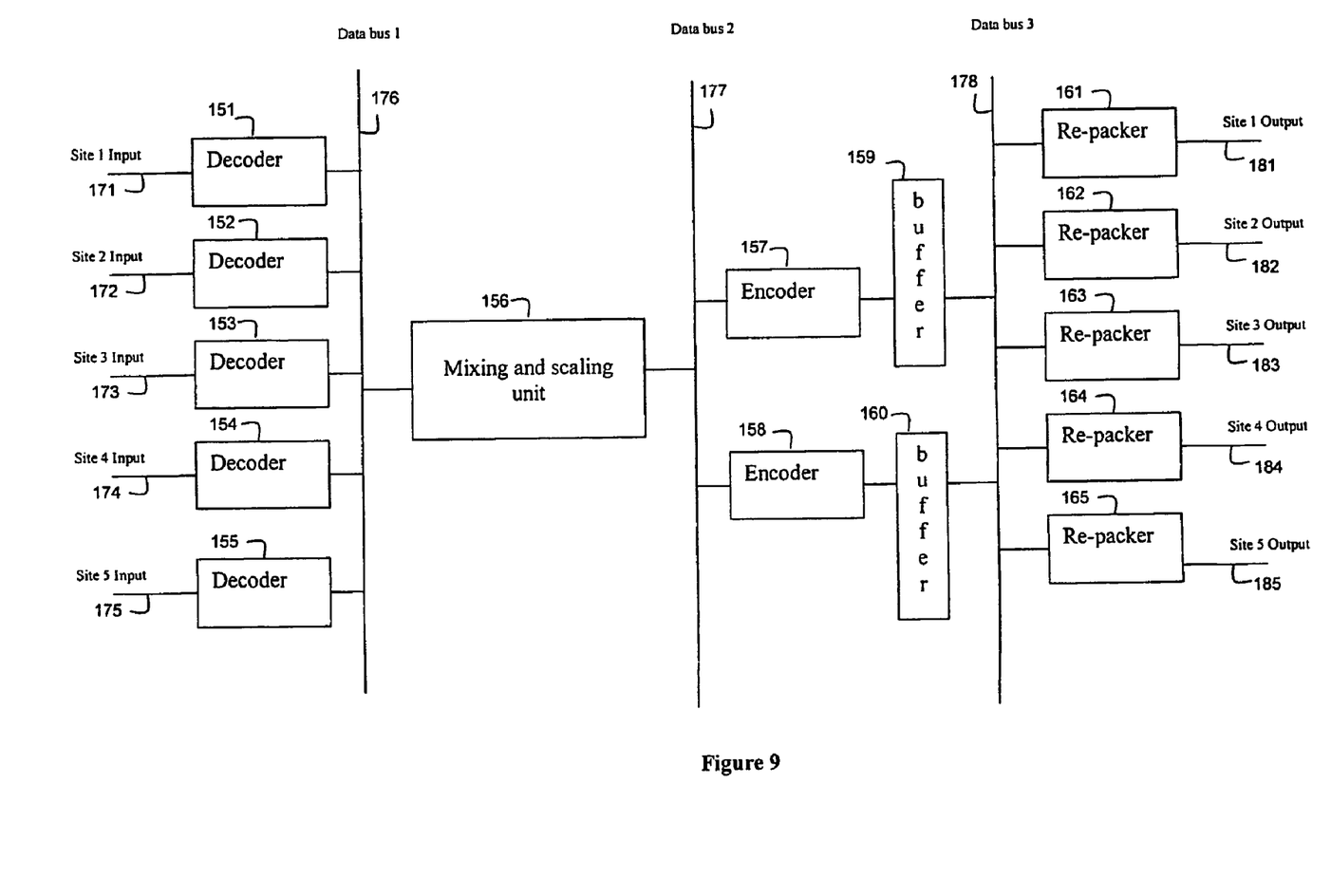
FIG. 9 is a schematic block diagram of one embodiment of the present invention.

FIG. 9 illustrates an example of the inside architecture of an MCU according to the present invention. This architecture is used according to the invention instead of the VPU of prior art as illustrated in FIG. 2. The pixel bus, memory and pixel scaling units are for simplicity replaced by a mixing and scaling unit 156. Note that the first 176 and the second 177 data buses in FIG. 9 alternatively could be merged to one common data bus. Also note that the actual implementation may be different, and that only the units relevant for the present invention are shown.

The input data streams 171, 172, 173, 174 and 175 are decoded with separate decoders, 151, 152, 153, 154, 155 respectively, one decoder for each site. The coding is performed according to the coding standard being used, in this case H.263. The decoded data is in the form of PCM data, and are made accessible for a Mixing and Scaling Unit (MSU) 156 on the first data bus 176.

The MSU 156 spatially mixes the PCM data 171, 172, 173, 174 from the first, second, third, and fourth sites, creating a first CP image. A second CP image is also created by placing the PCM data 175 from the fifth site in the first quadrant, leaving the remaining quadrants empty or filled with dummy data. The PCM data of the two spatially mixed images are then made accessible for the first 157 and the second 158 following encoders on the second data bus 177. The encoders 157, 158 fetch the PCM data of the CP images generated by the MSU 156 from the second data bus 177 and code each respective image. The result of the coding process is a number of macroblocks assembled in GOBs as described above. In the case of a CIF format according to H.263, a GOB contains 22 macroblocks, and each image consists of 18 GOBs. After coding the images, the GOBs are consecutively inserted in associated buffers 159, 160 respectively. The size of the buffers 159, 160 should be sufficiently large so as to accommodate the GOBs of at least one image. The outputs of the buffers 159, 160 are connected to a third data bus 178, which is also connected to the inputs of re-packers 161, 162, 163, 164, 165.

However, the number of bits representing a coded image is certainly not constant, but may vary substantially according to the variation of image content and movements from one image to another. The number of bits is also dependent on whether the image is INTRA coded or INTER coded, i.e. prediction from neighboring macroblocks in the same image, or prediction from previous image(s).

When coded data of complete synchronous pictures are inserted in the respective buffers, the re-packers 161, 162, 163, 164, 165 are ready to rearrange the order of the macroblocks to create the CP images required for the associated outputs 181, 182, 183, 184, and 185, respectively. The re-packers will be able to identify and isolate the macroblocks by means of the GOB and macroblock headers. The start of each GOB is indicated by a unique start code called GBSC (Group of Block Start Code), followed by GN (Group Number) that indicates the GOB number. In the headers of the macroblocks, COD indicates whether the macroblock is coded or not. If COD is "1", no further information is present for that macroblock, with motion vector for the whole block equal to zero and with no coefficient data. If COD is "0", further data of the macroblock will follow. Some of the further data may be of variable length, but the different codes are defined in such a way that the length of each code is well defined.

As the macroblocks are identifiable and temporarily stored in a buffer 159, 160, the re-packers 161, 162, 163, 164, 165 can read out the macroblocks in any order, creating any variant of a CP 4 image from the image of the five sites. As an example, consider the re-packer 164 creating the CP image for the fourth site, i.e. Site 4 Output 184. The first buffer 159 contains the coded data of CP image 1, while the second buffer 160 contains the coded data of CP image 2. The re-packer 164 fetches GOB 1-9 of CP image 1 in the same order as it occurs in the first buffer 159 to create the new CP image. However, when creating GOB 10, the re-packer 164 identifies and fetches the 11 first macroblocks of GOB 10 in the first buffer 159 followed by the 11 first macroblocks of GOB 1 in the second buffer 160. Further, GOB 11 is created by fetching the 11 first macroblocks in GOB 11 in the first buffer 159 followed by the 11 first macroblocks of GOB 2 in the second buffer 160. The 7 remaining GOBS are created similarly, finishing with GOB 18, which is created by fetching the 11 first macroblocks of GOB 18 in the first buffer 159 followed by the 11 first macroblocks of GOB 9 in the second buffer 160.

The re-packers 181, 182, 182, 184, 185 could be preprogrammed to fetch the macroblcoks from the buffers 159, 160 in a constant order, or the order of the macroblocks could be controlled by a control unit (not shown) allowing a re-packer to create various CP images.

Figure 10:
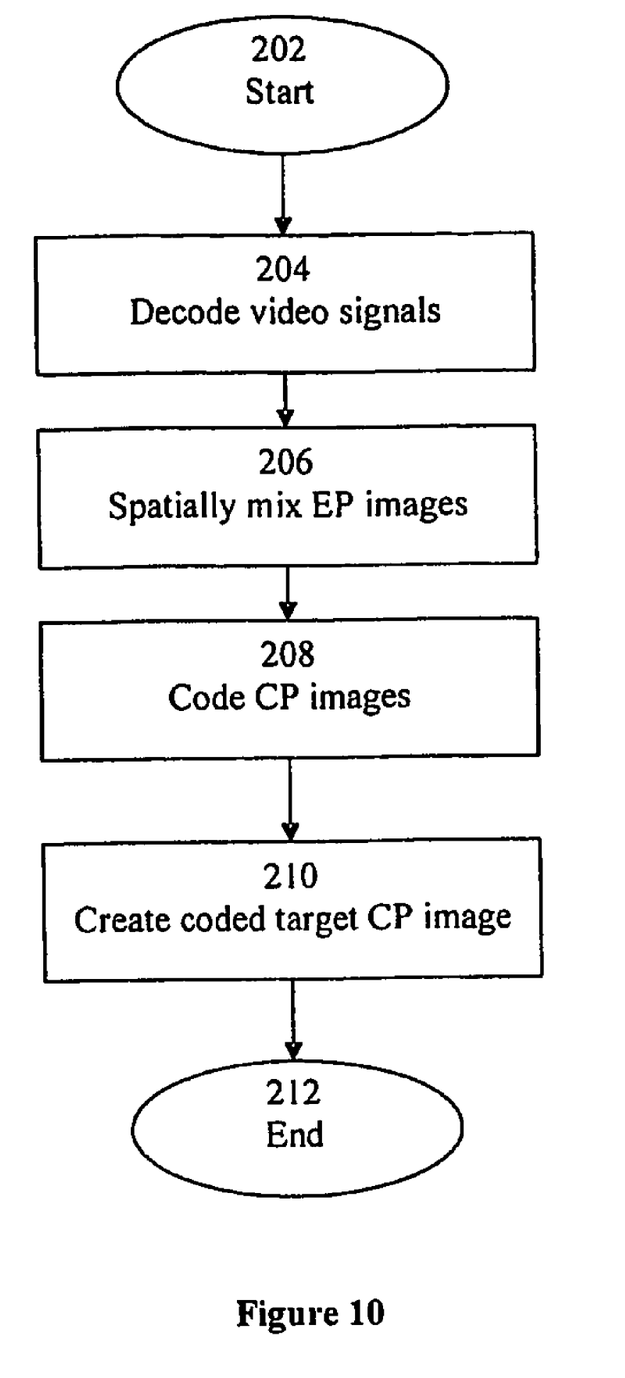
FIG. 10 is a schematic flow chart illustrating an embodiment of the method according to the invention.

FIG. 10 is a schematic block diagram illustrating an embodiment of the method according to the invention.

The method steps illustrated in FIG. 10 are included in a method for creating a coded target Continuous Presence (CP) image according to a video coding standard from a number of coded video signals which include defined orders of macroblocks. Each macroblock comprises coded video signals corresponding to a respective endpoint video image, received from endpoints participating in a multipoint video conference.

The method starts at step 202.

First, the decoding step 204 is performed, wherein the video signals are decoded to the corresponding endpoint video images.

Next, in the mixing step 206, the endpoint video images are spatially mixed to a number of CP images composed of regions respectively associated with each of the endpoint video images.

Next, in the coding step 208, the CP images are coded to a number of coded CP images respectively. This step establishes the defined orders of macroblocks corresponding to the video coding standard and a merging of region boundaries and macroblock boundaries.

Subsequent to the three preparatory steps 204, 206 and 208 above, the creating step 210 is performed. In the creating step 210, the coded target CP image is created by rearranging said orders of macroblocks in a predefined or controlled way.

Advantageously, the creating step 210 comprises replacing a first number m of macroblocks representing a region width in n numbers of succeeding GOBs representing a region height in a first of the number of coded CP images with m numbers of macroblocks in n numbers of succeeding GOBs from a second of the number of coded CP images.

The method ends at step 212.

As an alternative, the three preparatory steps of the process described with reference to FIG. 10, i.e. the decoding step 204, the mixing step 206 and the coding step 210, may be replaced with a single requesting step (not illustrated). In this requesting step, the endpoints are requested to code the respective endpoint video images according to the video standard and a certain resolution, bit rate and scaling.

In its most basic form, the method according to the invention merely includes the creating step 210.

The embodiments described so far have been limited to the creation of CP 4 images of CIF format according to the H.263 standard. However, people skilled in the art will realize that the basic principals of the present invention also are applicable to other CP images of other formats. As an example, the present invention could indeed be utilized when creating CP 9 images. Then the image boundaries within each GOB (in the case of CIF, H.263) are found after the 7'th and 14'th macroblock (alternatively after the 8'th and 15'th or 7'th and 15'th).

In any case it should be one re-packer (or at least one re-packer procedure) for each MCU output. The number of encoders depends on the relationship between the number of regions in the CP pictures and the number of sites that is to fill the regions of the CP images. It has to be sufficient encoders to generate one region for each site. In case of CP 4 and eight sites, two encodes would be sufficient for placing one region for each site in each of the totally eight quadrants. However, increasing the number of sites to nine would require one additional encoder to create a third CP 4 image in which the ninth region could reside.

In a more general embodiment of the invention, no decoding and scaling/mixing is carried out in the MCU. Instead, the endpoints are requested to transmit a coded image according to a certain standard, resolution, bit rate and scaling. The macroblocks of the incoming data streams is then loaded directly into the buffers (preferably one for each data stream), and the re-packers rearrange the macroblocks according to pre-programmed or controlled procedures, creating CP images without self view to be transmitted to the respective conference sites. As an example, consider five sites participating in a conference. A CP 4 view then requires that the endpoints place their respective images in one of the quadrants in an entire image before being coded. This is being requested to the endpoints together with coding information like standard, resolution, bit rate and scaling. The re-packers may then easily re-arrange the macroblocks of the incoming data streams when present in the respective buffers as described earlier.

The invention claimed is:

1. A method for creating a coded target Continuous Presence (CP) image according to a video coding standard from a plurality of coded video signals including defined orders of macroblocks, each comprising coded video signals corresponding to a respective endpoint video image, received from endpoints participating in a multipoint video conference, said method comprising:
   decoding said coded video signals with plural decoders to generate decoded video signals;
   spatially mixing said decoded video signals, resulting in a plurality of CP images including regions respectively associated with each of said endpoint video images with a mixing unit;
   encoding said plurality of CP images with plural encoders to generate at least a first coded CP image and a second coded CP image; and
   rearranging and combining macroblocks from the first coded CP image and the second coded CP image to create said coded target CP image with one or more re-packer units, said coded target CP image including macroblocks from the first coded CP image and the second coded CP image.

2. The method according to claim 1, further comprising:
   requesting the endpoints to code the respective endpoint video images according to the video standard and a certain resolution, bit rate and scaling.

3. The method according to claim 1, wherein said encoding said plurality of CP images comprises establishing defined orders of macroblocks corresponding to the video coding standard and a merging of region boundaries and macroblock boundaries.

4. The method according to claim 3, wherein the coded plurality of CP images and the coded target CP image each are of a CIF (Common Intermediate Format) format with 18 Group of Blocks (GOBs), each including 22 macroblocks, arranged in a stack formation so that the first 9 GOBs represent upper regions, and the last 9 GOBs represent lower regions.

5. The method according to claim 4, wherein the rearranging includes:
   replacing m numbers of macroblocks representing a region width in n numbers of succeeding GOBs representing a region height in the first coded CP image with m numbers of macroblocks in n numbers of succeeding GOBs from the second coded CP image.

6. The method according to claim 5, wherein m=11, n=9, and said regions each represents one quadrant of a CP image.

7. The method according to claim 5, wherein m=7 or m=8, n=6 and said regions each represents one eighth of a CP image.

8. The method of claim 1, wherein a number of the plural encoders is less than a number of the plural decoders.

9. An apparatus in a Multipoint Control Unit (MCU) for creating a coded target continuous presence (CP) image according to a video coding standard from a plurality of coded video input signals, each corresponding to a respective endpoint video image, received from endpoints participating in a multipoint video conference, comprising:
   a plurality of decoders configured to decode each of said coded video signals and to generate decoded video signals;
   a mixing and scaling unit configured to mix said decoded video signals spatially, resulting in a plurality of CP images composed of regions respectively associated with each of said endpoint video images;

a plurality of encoders configured to encode said plurality of CP images to generate a least a first coded CP image and a second coded CP image; and a re-packer configured to rearrange and combine macroblocks from the first coded CP image and the second coded CP image to create said target coded CP image, said target coded CP image including macroblocks from the first coded CP image and the second coded CP image.

10. The apparatus according to claim 9, wherein the coded plurality of CP images and the coded target CP image each are of a CIF (Common Intermediate Format) format with 18 Group of Blocks (GOBs), each including 22 macroblocks, arranged in a stack formation so that the first 9 GOBs represent upper regions, and the last 9 GOBs represent lower regions.

11. The apparatus according to claim 10, wherein the re-packer is further configured to replace m numbers of macroblocks representing a region width in n numbers of succeeding GOBs representing a region height in the first coded CP image with m numbers of macroblocks in n numbers of succeeding GOBs from the second coded CP image.

12. The apparatus according to claim 11, wherein m=11, n=9, and said regions each represents one quadrant of a CP image.

13. The apparatus according to claim 11, wherein m=7 or m=8, n=6, and said regions each represents one eighth of a CP image.

14. The apparatus of claim 9, wherein the number of encoders is less than the number of decoders.

* * * * *